US007711808B2

(12) United States Patent
Parry

(10) Patent No.: US 7,711,808 B2
(45) Date of Patent: *May 4, 2010

(54) METHOD AND SYSTEM FOR ONLINE PRINTER ERROR DATABASE

(75) Inventor: Travis J. Parry, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2785 days.

This patent is subject to a terminal disclaimer.

(21) Appl. No.: 10/006,637

(22) Filed: Nov. 8, 2001

(65) Prior Publication Data

US 2003/0088630 A1 May 8, 2003

(51) Int. Cl.
*G06F 3/12* (2006.01)
*G06F 15/16* (2006.01)

(52) U.S. Cl. ............... 709/224; 709/203; 358/1.15

(58) Field of Classification Search ............ 709/203, 709/224; 358/1.15

See application file for complete search history.

(56) References Cited

U.S. PATENT DOCUMENTS

| 5,620,264 | A | 4/1997 | Kagita |
| 5,625,757 | A | 4/1997 | Kageyama et al. |
| 5,716,148 | A | 2/1998 | Tamagaki |
| 5,923,834 | A * | 7/1999 | Thieret et al. ............... 714/25 |
| 5,956,487 | A | 9/1999 | Venkatraman et al. |
| 6,078,400 | A | 6/2000 | Mizutani |
| 6,519,048 | B1 * | 2/2003 | Tanaka ...................... 358/1.15 |
| 6,652,169 | B2 * | 11/2003 | Parry ........................ 358/1.15 |
| 6,666,594 | B2 * | 12/2003 | Parry .......................... 400/74 |
| 6,782,495 | B2 * | 8/2004 | Bernklau-Halvor ......... 714/44 |
| 7,126,716 | B1 * | 10/2006 | Kaufman et al. .......... 358/1.18 |
| 2002/0101604 | A1 * | 8/2002 | Mima et al. .............. 358/1.15 |

* cited by examiner

*Primary Examiner*—Patrice Winder

(57) ABSTRACT

Methods and apparatus for generating an online database of printer error messages. In one embodiment, a printer contains an error detecting device and an embedded Web server in communication with a global computer network. If printer errors are detected, error messages are generated. Each error message is conveyed through the embedded web server to an online database. The online database contains error information conveyed by a large number of printers, which can be monitored and analyzed. Methods of the present invention include providing a printer incorporating an embedded web server linked to a network, and a error detector. The error detector monitors print jobs sent to the printer, generating an error message when an error is detected. Error messages are conveyed by the embedded web server through the network to an online error message database and may be written to an internal printer error log.

14 Claims, 3 Drawing Sheets

METHOD AND SYSTEM FOR ONLINE PRINTER ERROR DATABASE

FIELD OF THE INVENTION

The present invention relates generally to printers and methods of storing and displaying printer generated error information. More specifically, the present invention relates to the generation of printer error messages and the communication of those error messages to an online database for analysis.

BACKGROUND OF THE INVENTION

Printers are well known computer peripherals widely used in both home and business computing environments. Printer technology has made rapid advances over recent years. State of the art printers offer ever increasing levels of speed, print quality, easily manipulated format options, and a wide variety of features, such as document collating, stapling, and various levels of print quality. Printers using Inkjet or laser technology are capable of reproducing almost any image. As printer technology advances, the process of printing a document from a computer workstation involves ever increasing numbers of steps. Errors can occur at any of these steps. It has become common practice to keep an "error log" in the printer memory, to track printing errors and technical problems. The repair of inoperable or damaged printers can be aided by examining the error log for patterns of errors occurring prior to breakage.

As it is used herein, the term "printer" signifies any device capable of providing printer function alone or, alternatively, any device providing printer function in combination with one or more other document processing functions, such as, for example, copying, scanning, or facsimile capabilities.

Printer manufacturers provide technical support for printing devices, including software and hardware upgrades to resolve problems that users have encountered with printers. Similarly, new products are designed to overcome difficulties users encounter with earlier designs, while incorporating new features. Traditionally, manufacturers have relied on a few sources for determining the difficulties and errors resulting from printer usage. These include tracking user requests made to technical support web pages and call centers, as well as reports from "beta users" or trial users of printers prior to the general sale of a model of printer.

These methods of gathering information on the common problems and difficulties users encounter with a printer face a number of shortcomings. Only a small sample of errors and problems are reported to service providers or manufacturers. Errors that are relativity easy for a user to remedy may never be reported, even if they may occur frequently. Even in-depth testing of individual printers may fail to show a pattern of errors that is common for that printer model, in actual use. The ability to automatically gather actual information on common printer errors for a large number of similar printers would constitute an improvement in the art. This would allow for improved servicing of those printers, including the provision of software and hardware upgrades, and improve the process of designing future printer models by providing error information based on actual use.

SUMMARY OF THE INVENTION

The present invention provides systems and methods for gathering error information on a number of printers. In one embodiment, a printing device contains an error detecting device and an embedded Web server in communication with a global computer network. If printer errors are detected, error messages are generated. Each error message is conveyed through the embedded web server to an online database. The online database contains error information conveyed by a large number of printers, which can be monitored and analyzed. Generally, the methods of the present invention comprise providing a printer incorporating an embedded web server linked to a network, and a detecting means for detecting printer errors. The error detector monitors print jobs sent to the printer, when errors are detected, the error detector generates an error message. The error message is conveyed by the embedded web server through the network to an online error message database. The error message may also be written to a printer error log.

DETAILED DESCRIPTION OF THE INVENTION

Figure 1:
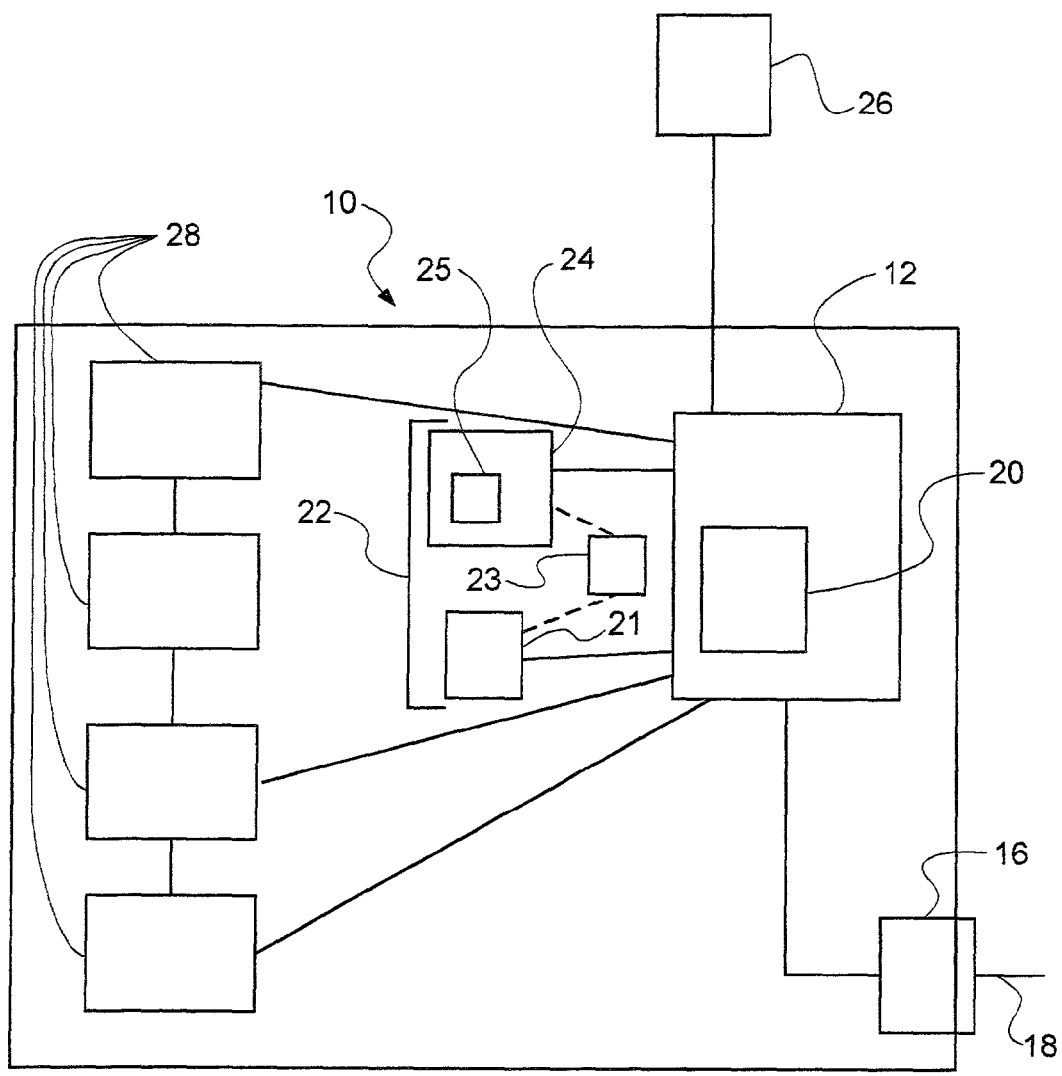
FIG. 1 is a block diagram of a printing device configured with an embedded Web server for use in the methods and system of the present invention.

The present invention provides methods and apparatus for collecting information on printing errors. In a preferred embodiment, the present invention makes use of an embedded Web server incorporated in a printer and a error detector to carry out the methods described herein.

It will be appreciated by those skilled in the art that the embodiments herein described while illustrating certain embodiments are not intended to so limit the invention or the scope of the appended claims. Those skilled in the art will also understand that various combinations or modifications of the preferred embodiments could be made without departing from the scope of the invention.

In a typical printing process over a network environment, a user at a computer workstation typically uses print driver software to load documents or images into a buffer (usually an area on a disk of a workstation), where a printer pulls them off the buffer at its own rate. The print driver functions to convert the text, graphics and print attributes specified by the user's workstation into a set of codes that the printer can translate and/or read. The set of codes is typically a version of Printer Control Language (PCL), developed by Hewlett-Packard for its dot-matrix, inkjet, and LaserJet series printers. The version of PCL most commonly used as the printer coding language is Page Description Language (PDL). Once the text, graphics and print attributes have been converted to PDL, the PDL is transmitted by the workstation over the network where it is received by the printer as a "print job." Examples of PDL's include Hewlett Packard's HP-GL/2 language and Adobe's PostScript.

As the printer receives the coded language from the print driver, it stores the information in high capacity memory storage (job retention), which typically comprises random-access memory (RAM) or a hard disk. A stored print job thus comprises one or more electronically stored files and the print attributes associated therewith. Before a typical print job (e.g., a PDL file) can be printed, however, its contents must be converted to a bit-mapped image format, also known as a raster image. The raster image is a bit-mapped representation of the document to be printed, with each bit in the bitmap representing the absence or presence of a dot (or pixel) on the printed page. A raster image processor ("RIP") in the printer typically translates PDL files to a raster image, also called a "RIP'ed" version of the file. Thus, the print files include data representing graphical images and the RIP'ed version is generated from the print file. Typically, print jobs are RIP'ed before storage in job retention, making them "print ready files." In some cases, print jobs are received by the printer in the form of raster image data. In that case, a processor in the printer may engage in pixel image manipulation when storing the print job. The printer then uses the data in the print ready file to control the mechanical printing components and the printing steps, such as paper feeding, controlling the inkjets of an inkjet printer or the laser scanning assembly and revolving drum and other associated mechanism of a laser printer. Errors can be introduced into the process at any of the above steps.

Referring to FIG. 1, one possible embodiment of a preferred printer 10 for carrying out the methods of the present invention is shown. Printer 10 is configured with both printer specific hardware and software and an embedded Web interfacing system (e.g., a Web server 12) for enabling access and interaction with other devices linked to local and external communication networks ("networks"), including the World Wide Web (the "Internet"), a local area network (LAN), a wide area network (WAN), an intranet, the computer network of an online service, etc. The printer specific hardware and software of printer 10 may be provided in any conventional printer configuration known in the art, including those associated with laser printers, impact printers, photographic printers, and inkjet printers. Printer 10 optionally may include one or more local displays 26, which may comprise a conventional monitor, a monitor coupled with an integrated display, an integrated display (e.g., an LCD display), or other means for viewing print queues, print attributes, and associated data or processing information, including printer specific information. Printer 10 also includes a network interface (I/O) 16 for bidirectional data communication through one or more and preferably all of the various networks (LAN, WAN, Internet, etc.) using communication paths or links known in the art, including wireless connections, ethernet, bus line, Fibre Channel, ATM, standard serial connections, and the like.

In a most preferred embodiment, the embedded Web interfacing system comprises a Web server 12 providing one or more Web server functions to requesting users linked by way of one or more of the various networks (LAN, WAN, Internet, etc.). The preferred printer 10 of the present invention may thus be the same or conceptually similar to the printer apparatus configured with an embedded Web server described in U.S. Pat. No. 5,956,487 to Venkatraman et al., assigned to the assignee of the present invention, the disclosure of which is incorporated by reference herein in its entirety.

Still referring to drawing FIG. 1, the embedded Web server 12 of the present invention is preferably housed in printer 10 on a single microprocessor board (not shown), which includes a microprocessor 20 responsible for controlling all aspects of Web server 12. Thus, microprocessor 20 is configured to process communication protocols and executable programs associated with Web server 12 which are stored in ROM (not shown) and/or hard disk memory 24. In one preferred embodiment, Web server 12 uses microprocessor 20 and the ROM-stored protocols to exchange data with other devices/users on one or more of the networks via Hyper Text Transfer Protocol (HTTP) and Simple Mail Transfer Protocol (SMTP), although other protocols such as File Transfer Protocol (FTP), Simple Network Management Protocol (SNMP), and Gopher document protocol may also be supported. Web server 12 is further configured to send and receive HTML formatted files. In addition to being linked to a local area network (LAN) or wide area network (WAN), printer 10 may be linked directly to the Internet via network interface 16 and communication links 18 attached thereto.

Microprocessor 20 is preferably part of the existing circuitry associated with a conventional printer. As such, microprocessor 20 is preferably configured to perform some or all of the printer specific functions of printer 10, including control of printer specific hardware and software.

Microprocessor 20 is provided with memory 22 in the form of RAM 21 and/or hard disk memory 24, which may be associated with the print cache of printer 10, or which may be provided separately from the print cache. As used herein, printer memory designated for temporarily or permanently storing one or more print jobs on hard disk memory 24 or other data storage device in printer 10 is referred to as "job retention" 25. In one embodiment, a percentage of memory 22 in printer 10 may be dedicated to Web server 12. Alternatively, Web server 12 may share the available memory 22 in printer 10 with the print cache. Typically, printer 10 will be equipped with a minimum of 64 megabytes of RAM 21, although less RAM may be used in certain configurations.

Preferably, microprocessor 20 of printer 10 is configured to translate coded language received from printer drivers of networked workstations into a bit-mapped image format (raster image format), and to store the translated print files in high capacity memory storage (i.e., job retention 25). Thus, the resulting "RIP'ed" print jobs, representing graphical images of text or drawings along with associated print attributes, are stored in job retention 25 as "print ready files."

Printer 10 will preferably contain executable software programs stored on hard disk 24 related to the operation of Web server 12. Hard disk 24 may also contain printer specific software programs relating to the operation of printer specific hardware. Alternatively, a separate hard disk (not shown) may optionally be provided with the requisite software programs for printing.

An error detector 23 located within the printer 10 monitors each step of the process of receiving, translating, storing and printing a print job. Preferably error detector 23 functions as microprocessor 20 follows a set of instructions program retained in memory 22 to check for errors at each step of the process of receiving, translating, storing and printing a print job. Alternatively, error detector 23 could be an additional processor which is solely dedicated to the error detection function. It will be appreciated that any method or system known, now or in the future, to those skilled in the art may be used to detect the errors from which error messages are generated. All such methods and systems are included within the scope of the present invention. Examples of some possible error detectors, among others that may be used in the present invention, are disclosed in U.S. Pat. No. 5,620,264, issued Apr. 15, 1997 to Kagita, and U.S. Pat. No. 5,625,757, issued Apr. 29, 1997 to Kageyama et al., each of which is incorporated herein by reference.

It is preferred that the error detector generate a stack trace for each error detected. The stack trace is a record that may be stored in memory 22, preferably as part of a printer error log. As a print job is performed, the instructions for performing that print job contained in the software, or firmware, controlling the printer are followed. This software may be expressed as a number of lines of code, each of which contains a statement or command for the printer to follow. Each line may be identified by an address identifying it by code number and line number, preferably this is expressed as a hexadecimal address. As each print job is performed, a program counter counts the lines of code that are utilized by the microprocessor 20. The stack trace contains at least the address of the line of code that was executed at the time of the error. More preferably, it contains a history of the addresses of code lines performed in attempting to execute that print job, as well as other information such as the details of the print job, up to and including a copy of the print job itself.

Mechanical components 28 of printer 10 are the mechanisms which are used to handle paper and print documents. Mechanical components 28 may include the paper feeding mechanism, the inkjets of an inkjet printer, the laser scanning assembly and revolving drum and other associated mechanisms of a laser printer, or other printing mechanisms known, now or in the future, to those skilled in the art.

Figure 2:
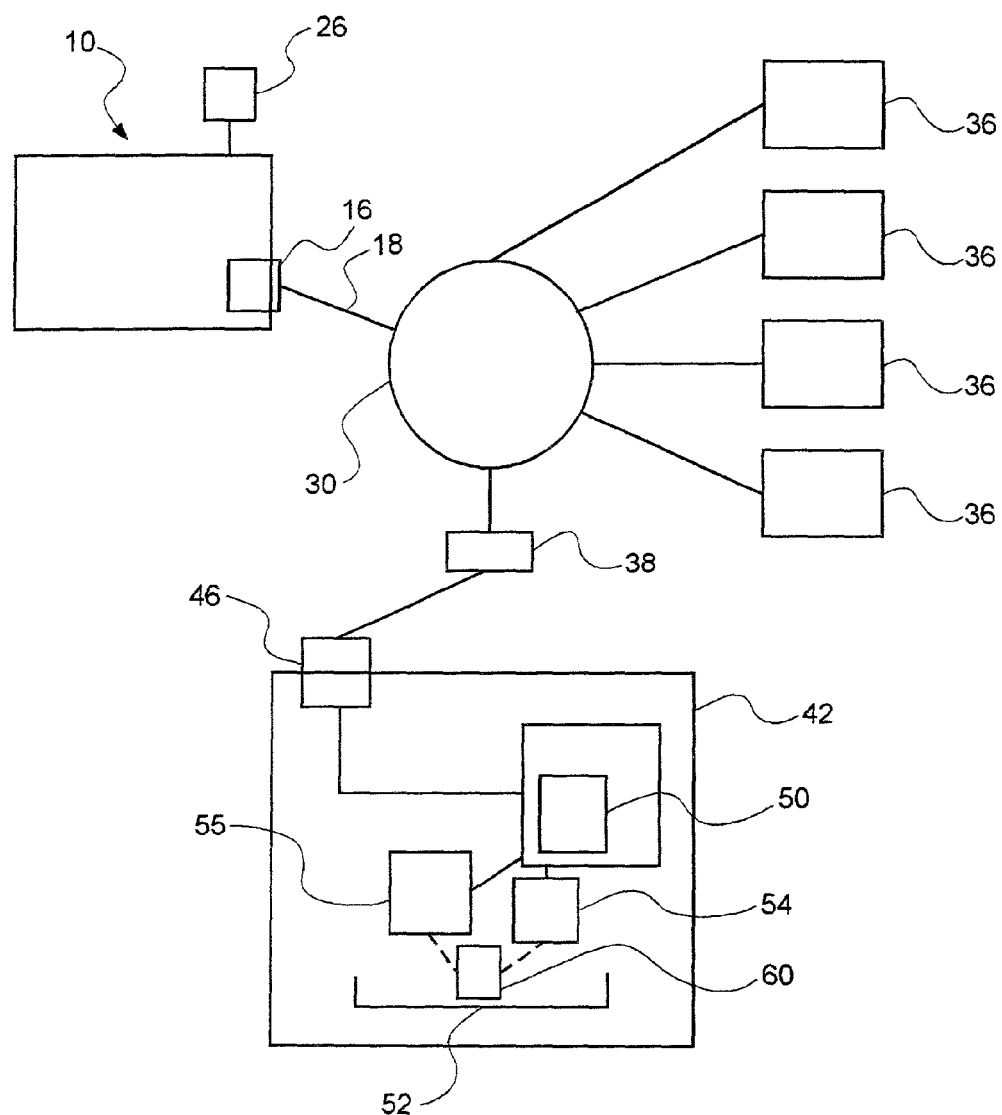
FIG. 2 illustrates a system of network components used in the methods and system of the present invention.

Referring now to drawing FIG. 2, printer 10 is shown as connected to a local computer network 30 to which are connected a number of computer workstations 36. Printer 10 is able to accept print jobs from each workstation 36 through network operative connections as known to those skilled in the art. Local network architecture 30 also includes a gateway 38, which will typically comprise a software and/or hardware firewall. Gateway 38 functions to block various external data transmissions from being sent to locations residing inside local network architecture 30. In this regard, gateway 38 may be restrictively configured to allow remotely situated users to access web pages within local network architecture 30 (e.g., via HTTP protocols), and to block all other access. Gateway 38 also provides a port for outgoing Internet traffic. Gateway 38 is further preferably configured to internally route IP-Packets sent from workstations 36 to other web-based devices (e.g., printer 10) also residing within local network architecture 30, and vice versa. It will be appreciated that the term network as used herein may include local network architecture 30, the internet and any other network, as known to those skilled in the art.

An external computer 42 includes an I/O interface 46 that allows connections to be made to a computer network, including an Internet or other connection, similar to network interface 16 discussed above. External computer 42 includes a microprocessor 50 which is provided with a memory 52. Memory 52 preferably includes RAM 54 and hard disk 55. Memory 52 may also include any other data storage devices or systems which are useful in practicing the present invention. External computer 42, preferably also includes input and output peripherals allowing user commands to be given an executed. Microprocessor 50 is configured to process error messages received through the I/O interface 46 and maintain an online error database 60 in the memory 52.

Figure 3:
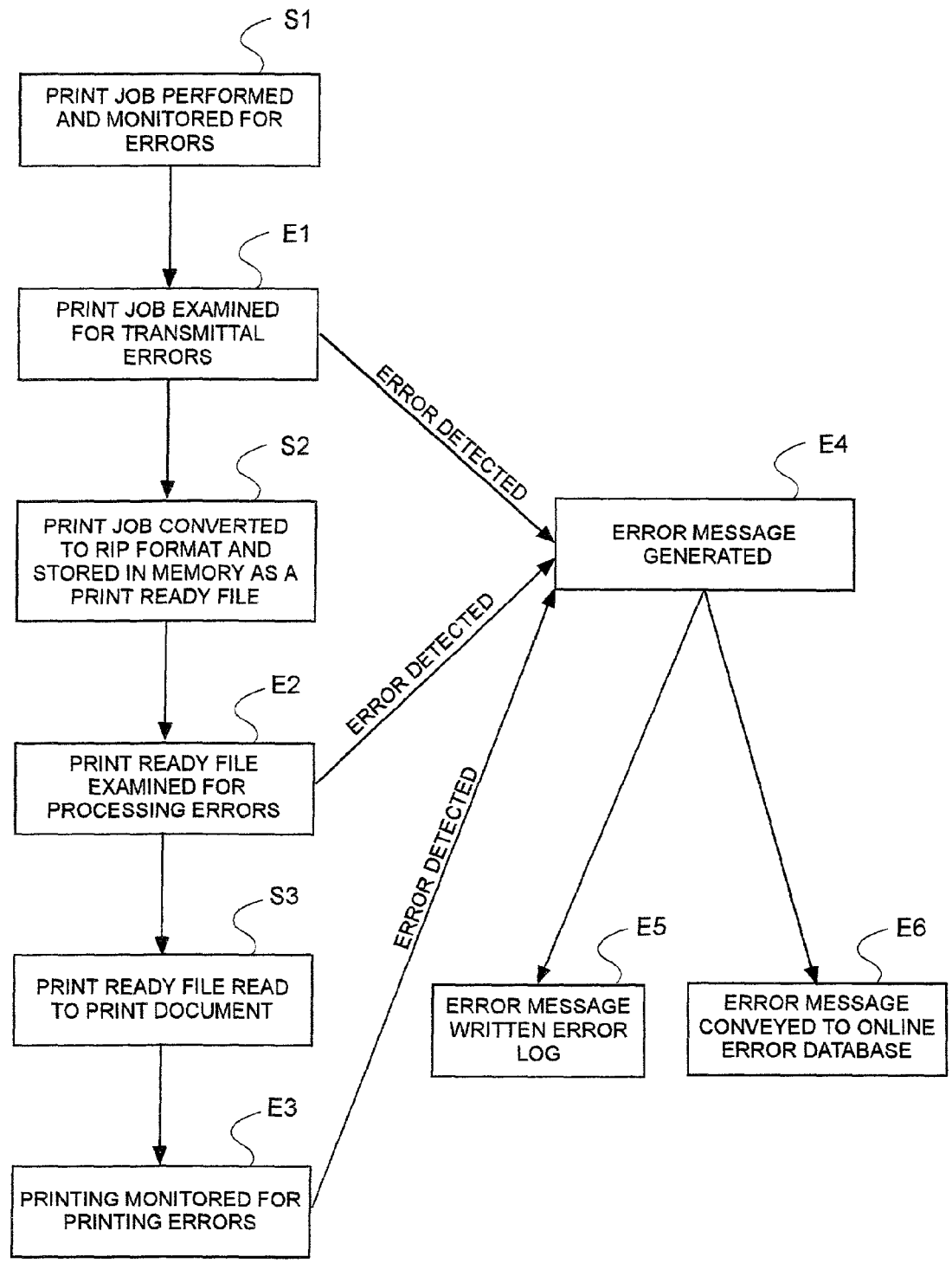
FIG. 3 is a flowchart showing a process of detecting printer error information and generating printer error messages that may be conveyed to an online error database in one embodiment of a method of the present invention.

Turning to FIG. 3, one possible embodiment of a process for detecting printer errors and generating an online error log is described. For illustrative purposes, this process will be discussed as it would take place in connection with the embodiment of FIGS. 1 and 2, but it will be appreciated that the process may be used on any suitable system. As shown in box S1, printer 10 receives a print job, this print job may either be sent, as a data transmission by a workstation 36, or downloaded directly from a print buffer by the printer 10. In the embodiments of FIGS. 1 and 2 this print job is received through the network interface 16. Preferably the print job is a data transmission in PDL or another PCL format, although any suitable format may be used. An error detector 23, preferably a series of instruction executed by microprocessor 20, then examines the print job for errors, as shown in box E1. If no errors are detected, the print job is converted into a RIP format, preferably by a series of instructions executed by the microprocessor 20 and stored in the job retention memory 25 as a print ready file, as shown in box S2. The error detector 23 examines the print ready file for errors, either during conversion or prior to storage, represented in box E2.

If no errors are detected in the print ready file, the printer 10 uses the print ready file to control the mechanical printing components 28 through the printing steps to generate a printed document, as depicted in box S3. Preferably, a series of instructions executed by microprocessor 20 are used to read the print ready file and control the mechanical components 28 accordingly. The error detector 23 monitors the mechanical components 28 through the printing steps to determine if an error occurs, as shown in box E3.

If error detector 23 detects an error at any of the error detecting steps, an error message is generated as shown in box E4. The error message may be generated by the error detector 23, or by the web server 12. In some preferred embodiments, the error message is then written into an internal error log that is kept in the memory 22 of the printer 10.

Web server 12 then uses microprocessor 20 to convey the error message to an online error database 60. If necessary, web server 12 may be used to convert the error message into an appropriate format, such as an HTML file or an email message. Web server 12 then conveys the error message, in appropriate format, as one or more data packages (in accordance with a transfer protocol such as IP or TCP) to the network address of computer 42. In an embodiment, such as that depicted in FIG. 3, this requires the data packets to be conveyed through network interface 16 and network 30, over the internet to I/O interface 46 of computer 42. Computer 42, which is preferably a network server, receives and assembles the data packet into the error message which is stored in the online database 60 in memory 52. Preferably, the reception and assembly is accomplished by microprocessor 50.

As error messages are generated, or conveyed by the web server 12, they contain information about the error, such as the stack trace for the error, the type of printer error, the stage of printing at which the error occurred, the printer 10 component which was generated or was involved in the error, and other information regarding the error. Additional information included in the error message, or added by the web server 12 may include identifying information for the printer 10, such as the model of the printer 10 and the version of the printer software which is being used to control the printer 10. Optionally, the information may contain the printer 10 serial number, or information identifying the user or owner of the printer 10.

It is preferred that printer 10 be configured so that a user of the printer, such as a network administrator, may enable or disable the conveying of error messages to online database 60. This will allow for user to protect the error message data, if they decide such data should not be disclosed outside their network. Typically, users will be compensated for opting in to providing information to the online error database, especially where such a system is used in a beta testing trial.

The error messages from a number of printers 10 may be all conveyed to the same network address, allowing the online database 60 to contain error messages from any number of printers. Alternatively, a number of different IP addresses may be used, allowing for a number of online databases to be maintained. It is preferred that if a number of different databases are kept, each database 60 will receive and contain information from a number of printers that are selected in various ways. This may be accomplished through the providing of each database 60 with separate IP addresses, among other possibilities. For example, only printers of a certain model may convey error messages to one database 60. Alternatively, only printers running certain software programs may send error information to a particular database 60. A single printer 10 may send error information to one or more databases 60 at the same time.

Online database 60 may be searched and analyzed to provide information on printing errors. This may provide a user, such as a printer manufacturer or printer service provider, with valuable information concerning the occurrence of various errors during actual use of the printers. This information could be analyzed in a wide variety of ways. For example, if database 60 contains error messages from a number of printer models, the frequency of errors involving a single component which is the same in a number of models may be analyzed. This could be used to determine the reliability of that specific component, or the problems that typically occur with that component. By performing this analysis on one component that is supplied by different suppliers, the reliability of the component from different sources could be assessed.

Accordingly, the present invention includes a method of analyzing information on printer errors, comprising collecting information on printer errors over a network, through providing one or more receiving computers, each including one or more one online error databases stored within a memory therein; attaching the receiving computer in communication with a network that may include the internet; receiving an error message at the receiving computer, the error message containing information on a printing error occurring on a printer incorporating a web server and conveyed over the network by that web server; processing the error message by the receiving computer into an online error database; retaining the error message in the online database, such that the online database of error messages may be analyzed by said error information; and analyzing said online error database to obtain information on printer errors.

It is preferred that the receiving computer also receive error messages from two or more printers, each error message containing information on a printing error occurring on a printer and being conveyed over said network by a web server incorporated by in each printer device. It is further preferred that the analysis of the online error database provide information on errors occurring on a number of printer.

The present invention further includes a method of collecting information on printer errors over a network, comprising providing a printer incorporating a web server and an error detector for detecting errors in printing functions; attaching the printer to a network, such that the web server is linked to the network; providing one or more receiving computers in communication with the network (directly or over the internet), each receiving computer having a memory with one or more online error databases stored therein, each online error database capable of receiving an error message generated by the printer and conveyed over the network; conveying a print job over the network to said printer; receiving the print job at the printer; examining the print job with the error detector for transmittal errors; detecting transmittal errors in print jobs which contain transmittal errors; generating a transmittal error message containing details of those transmittal errors; conveying the transmittal error message over the network with the web server; and receiving the transmittal error message into an online error database by the receiving computer.

It is preferred that this method further include includes processing the print job with the printer, as by converting the print job into RIP format and storing the print job in job retention memory; detecting process errors where process errors occur in processing the print job; generating a process error message containing details of a process error; conveying the process error message over said network by the web server; and receiving the process error message into an online error database by a receiving computer. Similarly it is preferred that the method include using the printer to print a document specified in the print job by controlling the mechanical components of the printer to produce the document; detecting output errors where said printing results in output errors during printing; generating an output error message containing details of any output errors; conveying the output error message over the network with the web server; and receiving the output error message into an one online error database by a receiving computer.

Preferably, the print job will originate on a workstation attached to the network and be conveyed over the network to the printer in PCL format. The error message is preferably generated in an HTML format or as an email message, although any other suitable format may be used.

The present invention thus advantageously provides methods and systems of gathering error information on any number of printers. Use of the present invention is particularly advantageous for gathering and analyzing actual use error information for use in designing new printers and upgrade packages for existing printers.

It will be appreciated by those skilled in the art that illustrated embodiments herein described are not intended to limit the invention or the scope of the appended claims. Various combinations and modifications of the preferred embodiments could be made without departing from the scope of the present invention and all such modifications are within the scope of the present invention. For example, it is understood that while the methods and apparatus of the present invention have been described in relation to a workstation interacting with a printer, one of skill in the art will recognize that the present invention may be utilized with a wide variety of networked and/or Web-based devices.

Thus, while certain representative embodiments and details have been shown for purposes of illustrating the invention, it will be apparent to those skilled in the art that various changes in the invention disclosed herein may be made without departing from the scope of the invention, which is defined in the appended claims.

What is claimed is:

1. A method of collecting information on printer errors over a network, comprising:

providing a printer incorporating a web server, said printer comprising a error detector for detecting errors in printing functions;

attaching said printer to a network, such that said web server is linked to said network;

providing at least one receiving computer in communication with said network, said at least one receiving computer including at least one online error database stored within a memory therein, said at least one online error database capable of receiving an error message generated by said printer and conveyed over said network;

conveying a print job over said network to said printer;

receiving said print job at said printer;

examining said print job for transmittal errors with said error detector;

detecting transmittal errors in said print jobs which contain transmittal errors generating a transmittal error message containing details of said transmittal errors;

conveying said transmittal error message over said network with said web server automatically in response to detection of the transmittal error;

receiving said transmittal error message into said at least one online error database by said receiving computer.

2. The method of claim 1, further comprising:

processing said print job with said printer;

detecting process errors where said processing results in said process errors;
generating a process error message containing details of said process errors; and
conveying said process error message over said network with said web server automatically in response to detection of the process error;
receiving said process error message into said at least one online error database by said receiving computer.

3. The method of claim 2, where said processing includes converting said print job into RIP format and storing said print job in a job retention memory located in said printer.

4. The method of claim 1, further comprising:
printing a document specified in said print job with said printer;
detecting output errors where said printing results in said output errors;
generating an output error message containing details of said output errors;
conveying said output error message over said network with said web server automatically in response to detection of the output error; and
receiving said output error message into said at least one online error database by said receiving computer.

5. The method of claim 4, where said printing includes controlling mechanical printing components of said printer to produce said document.

6. The method of claim 1, further comprising attaching a workstation in communication with the printer, such that said print job originates on said work station and is conveyed to said printer.

7. The method of claim 6, where said print job is conveyed to said printer in PCL format.

8. The method of claim 1, where said error message is generated in HTML format.

9. The method of claim 1, where said network comprises the internet.

10. The method of claim 1, wherein the error message is selectively stored in one of a plurality of online error databases based upon at least one of a model type of the printer or a set of software programs being run by the printer.

11. The method of claim 1, wherein the error message is stored in a plurality of online databases.

12. A system for garnering information on printer errors, comprising:
a plurality of printers, each printer incorporating a web server linked to a network, each printer including an error detector for detecting errors in printing functions;
at least one receiving computer in communication with said network, said at least one receiving computer having a memory thereon; and
at least one online error database stored within the memory of said at least one receiving computer, said at least one online error database capable of receiving an error message generated by any of the plurality of printers and conveyed over said network, wherein the printer is configured to automatically generate and convey the error message over said network to the at least one online error database upon detection of an error.

13. A method comprising:
detecting a first error at a first printer incorporating a first web server;
generating a first error message at the first printer;
conveying the first error message to a first online error database with the first web server over a network;
detecting a second error at a second printer incorporating a second web server;
generating a second error message at the second printer; and
conveying the second error message to the first online error database with the second web server over a network, wherein the first error messages automatically conveyed to the online error database in response to detection of the first error.

14. A method comprising:
detecting a first error at a first printer incorporating a first web server;
generating a first error message at the first printer;
conveying the first error message to a first online error database with the first web server over a network;
detecting a second error at a second printer incorporating a second web server;
generating a second error message at the second printer; and
conveying the second error message to the first online error database with the second web server over a network;
for each of a first plurality of printers comprising a first model type or running a first set of software programs, the first plurality of printers including the first printer and the second printer, conveying generated error messages to the first online error database based on the first model type or the first set of software programs of each of the first plurality of printers; and
for each of a second plurality of printers having a second distinct model type or running a second distinct set of software programs, each printer of the second plurality of printers incorporating a web server:
detecting error messages;
generating error messages; and
conveying the generated error messages to a second online error database based on the second distinct model type or second set of software programs of each of the second plurality of printers.

* * * * *

UNITED STATES PATENT AND TRADEMARK OFFICE
CERTIFICATE OF CORRECTION

PATENT NO. : 7,711,808 B2
APPLICATION NO. : 10/006637
DATED : May 4, 2010
INVENTOR(S) : Travis J. Parry It is certified that error appears in the above-identified patent and that said Letters Patent is hereby corrected as shown below:

In column 8, lines 58-60, in Claim 1, delete
"detecting transmittal errors in said print jobs which contain
transmittal errors generating a transmittal error message
containing details of said transmittal errors;"
and insert -- detecting transmittal errors in said print jobs which contain
transmittal errors;
generating a transmittal error message containing details of
said transmittal errors; --, therefor.

Signed and Sealed this

Thirty-first Day of August, 2010

David J. Kappos
*Director of the United States Patent and Trademark Office*